United States Patent [19]

Lundstedt et al.

[11] 4,416,905

[45] Nov. 22, 1983

[54] METHOD OF PREPARING CULTURED DAIRY PRODUCTS

[75] Inventors: Erik Lundstedt, Boca Raton, Fla.; Edgar A. Corbin, Jr., Manchester, Mo.

[73] Assignee: Mallinckrodt, Inc., St. Louis, Mo.

[21] Appl. No.: 295,583

[22] Filed: Aug. 24, 1981

[51] Int. Cl.³ .............................................. A23C 9/12
[52] U.S. Cl. ...................................... 426/34; 426/42; 426/43; 426/583
[58] Field of Search ...................... 426/34, 42, 43, 583

[56] References Cited

U.S. PATENT DOCUMENTS

| | | | |
|---|---|---|---|
| 2,196,239 | 4/1940 | Werkman et al. | 426/34 |
| 3,022,176 | 2/1962 | Lawrence et al. | 426/583 |
| 3,048,090 | 8/1962 | Lundstedt | 426/583 |
| 3,235,387 | 2/1966 | Stumbo | 426/583 |
| 3,340,066 | 9/1967 | Corbin | 426/583 |
| 3,432,306 | 3/1969 | Edwards | 426/583 |
| 3,535,121 | 10/1970 | Luksas | 426/43 |
| 3,969,534 | 7/1976 | Pavey et al. | 426/583 |
| 4,177,293 | 12/1979 | Forman et al. | 426/43 |
| 4,191,782 | 3/1980 | Vedamuther | 426/43 |
| 4,304,862 | 12/1981 | Troller | 426/34 |

OTHER PUBLICATIONS

American Dairy Review, Nov. 1971, pp. 44–46.
Journal of Dairy Science, Nov. 1962, vol. XLV, No. 11, pp. 1327–1331.

*Primary Examiner*—Jeanette M. Hunter
*Attorney, Agent, or Firm*—Bernard, Rothwell & Brown

[57] ABSTRACT

A method for the production of cultured dairy products, such as buttermilk, yogurt or sour cream, by the controlled fermentation of a liquid medium consisting of a major portion of light cream, milk, low-fat milk or skim milk or reconstituted skim milk powder or buttermilk powder, or a mixture of these two components. The liquid medium is fermented using a bacterial fermentation culture. The fermentation of the medium is allowed to proceed for sufficient time to achieve a pH in the range of between 6.2 to about 4.9, at which point the liquid medium is then cooled to a fermentation rate-reducing temperature and acidulated to a pH of 4.7 or below using food grade acids such as those selected from the group consisting of lactic, citric or acetic acid.

28 Claims, No Drawings

METHOD OF PREPARING CULTURED DAIRY PRODUCTS

This invention is related to an improved method for making cultured dairy products, such as buttermilk, yogurt or sour cream. More particularly, the invention relates to a method for the preparation of a cultured dairy product that has the improved product qualities of exceptional shelf life, non-deteriorating flavor, taste and aroma, a consistent and desirable viscosity, and avoidance of the tendency of the product to whey-off during storage or use. A further object of the invention is to provide a cultured buttermilk product that will have a consistent and predictable carbonic acid content, which content is necessary to augment and accentuate the desirable cultured flavor. A further object of the invention is to provide a process for producing a cultured dairy product that will significantly reduce the present processing time by prior art bacterial culture fermentation methods.

The prior art process for the manufacture of cultured dairy products using bacterial cultures, while straightforward, is subject to varying process parameters such as the composition of the dairy medium, the composition of the bacterial culture, and the activity of the bacterial culture. In view of such complexity, the production of a consistently high quality cultured buttermilk product has proven particularly difficult.

The difficulties inherent in the production of cultured buttermilk result in buttermilk of decreased quality and consumer acceptability. For example, a study by the American Cultured Dairy Products Institute Scoring Clinic published in The American Cultured Dairy Products Journal, evaluating the taste of buttermilk samples submitted from various creameries throughout the United States yielded the following results:

| Score | 1974 | 1978 |
|---|---|---|
| Excellent | 0% | 10% |
| Good | 26% | 20% |
| Fair | 26% | 55% |
| Poor | 48% | 15% |

Similarly, a study reported in the American Cultured Dairy Products Journal, Vol. 8, No. 2, May 1973, showed the results of another survey:

| Score Remarks | Samples |
|---|---|
| Coarse | 20% |
| Unclean | 25% |
| Bitter | 15% |
| Rancid | 10% |
| Green | 5% |
| Metallic | 5% |

The above defects are discussed in relation to cultures used by the industry in E. Lundstedt "Experience and Guidelines for Commercial Application of Newest Knowledge of Cultures", Cultured Dairy Products Journal, Vol. No. 1, May, 1969 and E. Lundstedt "All You Want to Know about Buttermilk", Dairy & Ice Cream Field, October, 1975.

A probable result of the general unavailability of high quality cultured buttermilk has been that per capita consumption in the United States has decreased from 8.28 lbs. in 1954 to 4.86 lbs. in 1974. It is believed that the present invention will serve to reverse this trend since it provides a method for producing a highly palatable buttermilk in an economical manner.

The prior art methods for buttermilk production utilize a liquid dairy medium comprising skim, low-fat or whole milk to which has been added some cream or non-fat dried milk. The diary medium is heated to a temperature of approximately 190°–200° F. and held for a sufficient period of time to allow for pasteurization and coagulation of the albumin and globulins. Then the medium is cooled to approximately 72° F. and inoculated with sufficient bacterial culture to produce acid coagulation of the liquid diary medium in a period of approximately 16 hours. Generally, in commercial production of buttermilk, a mixture of two types of bacteria is utilized to produce acid coagulation of the milk. Usually, the culture comprises a combination of lactic acid bacteria and aroma bacteria. Streptococcus lactis and Streptococcus cremoris primarily ferment the lactose in the milk to lactic acid. The aroma bacteria, e.g. an aroma- and flavor-producing strain of *Leuconostoc cremoris*, grow concurrently with the lactic acid bacteria, producing some lactic acid together with small amounts of acetic acid, ethyl alcohol, and carbon dioxide. The major chemical change produced by the aroma bacterial species is the conversion of citrates normally present in milk into diacetyl. The acids and diacetyl produced during fermentation are volatile and contribute to the characteristic flavor and aroma of cultured dairy products. The casein in cultured buttermilk is coagulated by the lactic acid and imparts a thick desirable consistency to the buttermilk product.

Although the process appears straightforward, the task of keeping the cultures active with the proper proportions of bacterial species is exceedingly difficult. The principal defects that can occur in cultured dairy products due to the above-noted processing variables are poor stability which results in whey separation, insufficient development of flavor and aroma, insufficient acid development, or excessive acid development. The avoidance of these defects is an object of the present invention.

In the prior art method of buttermilk production practiced for the past 50 years, skim milk, whole milk or a combination of the two was inoculated with one or two percent by weight of starter culture and ripened at 72° F. for 14 to 18 hours to develop a pH in the product of about 4.5. The taste and aroma of the buttermilk product is determined in part by the composition of the starter culture and the quality of the dairy medium used. The most important aroma bacterium used in the prior art production of buttermilk is an aroma- and flavor-producing strain of *Leuconostoc cremoris*, a very difficult organism to propagate in milk. This strain of *Leuconostoc cremoris* is primarily responsible for the aroma in buttermilk when grown in combination with lactic acid bacteria in a symbiotic growth. However, a few parts per million of quaternary ammonium compounds in the diary medium will prevent *Leuconostoc cremoris* growth, resulting in a buttermilk having an unclean taste and a cabbage-like odor. Additionally, a lack of citric acid or citrates in the diary medium will prevent the culture bacteria from producing the aromatic compounds required for an acceptable product. Seasonal variations in the citrate content of milk vary from nearly zero to over 2,000 parts per million. Consequently, such differences in the citrate level of the diary medium used in buttermilk production can result in a final product of decreased flavor and aroma.

The lactic streptococci include *Streptococcus lactis* and *S. Cremoris*. The aroma bacteria used in conventional buttermilk cultures include the *Leuconostoc cremoris*, and *S. diacetilactis*, also known as *S. lactis*, subspecies *diacetylactis*. *S. diacetilactis* differs from most leuconostocs in that it can produce enough acid to coagulate milk in addition to fermenting citrates. Additionally, *S. diacetilactis* will tolerate up to ten parts per million of quaternary ammonium compounds while the leuconostocs will generally tolerate not more than two parts per million. A significant difference between *S. diacetilactis* and an aroma- and flavor producing strain of *L. cremoris* relates to their ability to ferment citric acid at different pH levels in the production of diacetyl or aroma. The fermentation of citric acid is a requisite for the production of aroma. *S. diacetilactis* will convert 2 molecules of citric acid to 4 molecules of carbon dioxide and 3 molecules of acetic acid plus diacetyl and acetylmethyl-carbinol. If the fermentation of lactose brings the pH below 5.0, acetaldehyde will be formed to the extent that the cultured milk becomes unpalatable due to cabbage-like flavor and green, unclean flavors resembling sour yogurt. To avoid these flavors the starter laboratories usually blend leuconostoc bacteria in such cultures since leuconostoc is a scavenger of acetaldehyde and can reduce this compound to tolerable levels. When grown separately, *S. lactis* ferments about 80% of the ctric acid in the milk product above a pH of 5, and singly or in combination with *S. cremoris*, whereas *L. cremoris* requires a combination of lactic acid bacteria and ferments 80% of the citric acid below a pH of 5. See, "Some Properties of Starter Cultures Containing *S. Diacetilactis* 1951", P. Swartling and Brita Lindgren, Report from the Swedish Dairy Experimental Institute Alnarp No. 34. *S. diacetilactis* fermenting citric acid above a pH of 5 will produce a product having a certain flavor of a pleasant nature but lacking the high diacetyl aroma of an analogous product made by *L. cremoris* strains at a pH of below 5.

Combination starters composed of 15–20% by weight *S. diacetilactis*, 4–6% by weight *L. cremoris*, with the balance of the culture or starter comprising *S. cremoris/S. lactis*, may produce an aromatic buttermilk. However, resulting products have not always been dependable since *S. diacetilactis* may overgrow the other bacteria in the starter resulting in a cabbage-like flavor when fermented for a period of 14–18 hours at 72° F.

In summary, production of a cultured buttermilk of a consistently high quality has proven difficult. Fermentation periods of 14 to 18 hours can tie up valuable equipment as well as increase the possibility of contamination of the culturing medium. The propagation of primary aroma bacteria used in present processes such as an aroma- and flavor-producing strain of *Leuconostoc cremoris* requires great skill to achieve. Seasonal variation in liquid dairy media used can often result in production batches of disparate quality. Finally, pH reduction to levels necessary for production of the aromas required in a quality product can easily bring about the production of unwanted by-products as well, over the long fermentation period.

The present invention takes a different approach to the problem of uniformity in the production of cultured buttermilk products. In order to ensure an adequate supply of citrates for conversion by *S. diacetilactis* to carbon dioxide and flavor compounds, citric acid or a citric acid salt, such as sodium citrate can be added to the liquid dairy medium in amounts ranging, for example, from between about 0.10% to 0.30% by weight, preferably about 0.25% by weight. Liquid dairy media suitable for the production of buttermilk according to the process of the present invention may contain low fat milk or reconstituted non-fat dry milk, preferably containing about 2% butterfat, to which non-fat milk powder has been added. Additional ingredients of the medium may include such stabilizers as locust bean gum, guar gum, gum karaya, monoammonium phosphate, carrageenan, propylene glycol alginate and salt. The culture or starter used in the production of buttermilk in the present invention may contain *Streptococcus lactis*, subsp. *diacetylactis*, e.g., ATCC No. 15346, as well as additional bacteria such as *S. cremoris*, e.g., ATCC No. 9625, *S. lactis*, e.g., ATCC No. 14871 and leuconostoc species, such as an aroma- and flavor-producing strain of *L. cremoris*, e.g., ATCC No. 19154. A preferred culture used in buttermilk comprises by weight about 20% to about 50%, preferably about 30% of *S. lactis*, subsp. *diacetylactis*, about 40% to about 60%, preferably about 50% of *S. cremoris*, about 10% to about 20%, preferably 10% by weight of *S. lactis*, about 8% to about 12%, preferably about 10% of the *Leuconostoc cremoris* strain.

An example of a suitable culture or starter useful in buttermilk production is a mixture of equal parts by weight of Marschall TM Frozen Concentrated OP 1 Bulk Set Culture, Marschall TM Frozen Concentrated CAF Direct Set Culture and Marschall TM Frozen Concentrated CJB Bulk Set Culture. Another example contains 50% by weight of a mixture of equal parts of Marschall TM Frozen Concentrated OP1, Marschall TM Frozen Concentrated CAF, Hansen TM Frozen Concentrated CAF RediSet Combined and 50% by weight of a mixture of equal parts of Hansen TM Powdered Dri Vac Culture No. 70, Hansen TM Powdered Dri Vac Culture No. 44, and Hansen TM powdered Dri Vac Culture No. 8. The Marschall TM cultures are available from Miles Laboratory, Inc., Biotechnology Group, Box 932, Elkhart, Ind. 46515 and the Hansen TM cultures can be obtained from Chr. Hansen Laboratories, 9015 W. Maple Street, Milwaukee, Wis. 53214.

In comparison with prior art processes, the liquid dairy medium is inoculated with relatively greater amounts of starter culture, about 4–6% by weight of the starter culture, and is fermented at relatively higher temperatures, ranging between approximately 80°–90° F., preferably about 86° F. for a period of only about two to five hours, preferably about three to four hours to produce a pH ranging between about 5.2 to 6.2. The cultured medium is then cooled to a fermentation rate-reducing temperature ranging between about 40° to 50° F., preferably between about 40° to 45° F. Upon cooling, the cultured liquid dairy medium is then acidified by the addition of food grade acid to a pH of about 4.4–4.6. Such acids are preferably selected from the group consisting of lactic, citric and acetic acid.

Control over the fermentation process afforded by the present invention serves to determine the amount of carbon dioxide present in the final product. Furthermore, such control allows termination of fermentation before the culture bacteria begin producing off-tastes. By keeping the pH of the fermenting liquid medium between about 5.2 to about 6.2 for a period of no more than about five hours and reducing fermentation activity by direct acidulation of the media to a pH of about 4.4 to about 4.6 using food grade acid, fermentation can be arrested at the optimum flavor point. Once this optimum flavor point is reached, the resulting product may be refrigerated for storage at temperatures ranging between about 35° F. to about 40° F., preferably about 38° F. Cultured dairy products such as yogurt or sour cream can also be produced according to the present invention.

The manufacture of yogurt, according to the method of the present invention, follows the same general procedures as are used for making buttermilk. *Lactobacillus bulgaricus,* a lactic acid-forming rod-shaped bacterium is grown in combination with *Streptococcus thermophilus,* a coccus-shaped bacterium. These bacteria are traditionally associated with yogurt production since they can grow and produce lactic acid at the higher temperatures of conventional yogurt manufacture than those bacteria used in culturing buttermilk. The liquid dairy medium used is generally milk to which some cream or non-fat dried milk has been added. Such added milk solids or cream gives the yogurt a heavy gel-like body. Although prior art methods require incubation temperatures of about 106°-118° F., yogurt culture incubation according to the present invention is carried out at the same temperatures used in buttermilk production, i.e., preferably about 86° F. Incubation of the culture is allowed to proceed further than that of buttermilk fermentation, i.e., to a pH of between 4.5 and 5.2, preferably between about 4.8 and 4.9. Such an incubation period can range from between about 3 to 4 hours. The cultured product is cooled to a fermentation rate-reducing temperature of between 65° F. to about 75° F., preferably between about 71° to 72° F. At this point, direct acidulation of the culture media is accomplished by adding food grade acids such as lactic, citric and acetic acids. The resulting pH of the product ranges from between about 3.7 to 4.2, preferably about 3.9. The acidified product can then be refrigerated at temperatures between about 35°-40° F.

The manufacture of sour cream according to the present invention also follows the same general procedure for buttermilk production as described above. Starter cultures used in sour cream manufacture are similar to those used in prior art processes of buttermilk production, i.e., mixture of *Streptococcus lactis, S. cremoris* and leuconostocs, such as *L. cremoris,* e.g., ATCC No. 19254. Other standard commercial sour cream cultures are also suitable for sour cream manufacture according to the process of the present invention. Light cream having a butterfat content of about 18 to 20%, preferably about 18%, is a suitable dairy medium for making sour cream products according to this invention. Incubation of the pasteurized inoculated dairy medium is carried out at temperatures between about 80° to about 90° F., preferably about 86° F. until the medium pH is reduced to between about 5.1 to 5.4. Such an incubation period generally lasts from about 5 to 7 hours. The resulting cultured product is then cooled to a fermentation rate-reducing temperature between about 65° to 75° F., preferably between about 70° to 72° F. At this point the cultured product is directly acidulated by adding food grade acids such as lactic, citric and acetic acids. The resulting pH upon addition ranges from between about 4.3 to 4.5, preferably about 4.4. The acidified cream can then be refrigerated.

The following examples further illustrate the present invention, however, they are not to be construed as limiting the invention as claimed herein.

EXAMPLE I

Production of Cultured-Acidified Buttermilk

Stabilizers comprising 5.7 grams of gum stabilizer (locust bean gum, gum karaya, carrageenan and mono-ammonium phosphate), 10 grams of non-fat milk powder, 2 grams salt and 2 grams sodium citrate are added to 2 quarts of fresh whole milk at 90° F. The mixture is heated using agitation to 190° F. and held for 10 minutes. The liquid medium is then cooled to 90° F. Citrated whey medium is prepared from steamed and filtered cottage cheese whey to which is added 4.25% by weight sodium citrate.$2H_2O$, and 0.2% by weight autolyzed yeast extract. The whey medium is subsequently sterilized in bottles at 10 lbs. steam pressure for 15 minutes, or by setting in boiling water for one hour. 100 ml. of the citrated whey medium containing an actively growing Vitex TM V-8 whey culture containing 15% Marschall frozen concentrated O-P-1 and 85% Hansen TM Dri Vac Nos. 70, 82, 92 and 253 of *Streptococcus lactis,* subsp. *diacetylactis* (ATCC No. 15346), *Steptococcus cremoris* (ATCC No. 9625) and some Leuconostoc strains, e.g. *L. cremoris* (ATCC No. 19254) is added to the milk. After thorough mixing of the starter with the milk, agitation is stopped and the milk is incubated at 85°-86° F. to develop flavor and some acidity. The pH of the milk mixture after the addition of the citrated whey medium is 6.30. After 1 hour, the pH of the medium is 6.28. At 2 hours, the pH is 6.20. At 3 hours, the pH is 6.00 and at 4 hours, the pH is 5.66.

After 4 hours of incubation, the milk has a pleasing aroma, a clean cultured taste and $CO_2$ carbonation can be detected. At this point the milk is cooled with agitation to 50°F. At 50° F. 12 ml. of acidifying mixture of lactic, citric and acetic acid is added in sufficient quantity to lower the pH of the liquid cultured medium to 4.47. The added acids accentuate the cultured flavor, producing a strong, clean pleasant flavor and good aroma. The finished buttermilk is poured into containers and refrigerated. After refrigeration overnight, the product is thickened to an acceptable buttermilk consistency having a viscosity of approximately 1880 cps. After 2 weeks of storage, the product is changed little. It retains its smooth, thick consistency with good aroma and a clean cultured buttermilk flavor.

EXAMPLE II

Production of Cultured-Acidified Buttermilk 100 ml. of heavy cream (36% fat), 90 grams of non-fat milk powder and 90 grams of sweet, dry buttermilk powder were added to 1,800 ml. of warm water. After the powders had dissolved, the following stabilizing ingredients were added: 1.6 grams locust bean gum, 1.2 grams guar gum, 1.0 gram carrageenan, 1.2 grams gum karaya, 3.0 grams salt, 0.7 gram sodium citrate and 0.7 gram citric acid. The milk mixture was agitated at 120° F. until all ingredients were dissolved or hydrated, and then heated to 192° F. for one minute to pasteurize the milk mixture and to activate the stabilizing ingredients. The milk mixture was then cooled to 86° F. where there was added 100 ml. of citrated whey containing 75% of Hansen TM Dri Vac No. 92 and No. 253, and 25% of EL-16 Oregon State *Streptococcus diacetilactis* No. 16 and Vivolac TM 500 (*S. citrovorous*) obtained from Vivolac Cultures Corp., Indianapolis, Ind. 46201. The mixture was stirred for 2 minutes and then incubated at 86° F. to achieve the following pH levels as a function of time.

| Time (hours) | ph |
|---|---|
| 2 | 6.2 |
| 3 | 6.10 (pleasant taste) |
| 4½ | 5.80 (nice, clean aroma) |
| 5½ | 5.40 (mild, clean flavor). |

After 5½ hours the cultured product was cooled to 50° F. with agitation and 8.75 ml. of the mixture of lactic, citric, and acetic acid was added as required to lower the pH of the liquid to 4.4 The taste of the buttermilk product was clean, medium sharp and pleasant. The buttermilk was then bottled and refrigerated. After overnight refrigeration, the product showed no signs of whey-off, and had a viscosity of about 740 cps. The product poured smoothly and had a very clean buttermilk flavor with some detectable $CO_2$ carbonation. The aroma was faint but pleasant and clean.

EXAMPLE III

Production of Cultured-Acidified Buttermilk 105 grams locust beam gum, 105 grams guar gum, 313 grams monoammonium phosphate, 72 grams carrageenan, 210 grams salt, 2174 grams non-fat milk powder, and 140 grams of sodium citrate were added to 35 gallons of fresh, pasteurized, 2% butterfat milk at 106° F. The mixture was agitated at 106° F. for 10 minutes to assure dispersion and solution of the ingredients, heated to 190° F. and held above 190° F. for 5 minutes to activate the mixture. Upon cooling to 92° F., there were added 6½ quarts of citrated whey media as well as 2 quarts of cultured acidified buttermilk. The media contains a bacterial culture composed of one-third Marschall TM OP-1, one-third Marschall TM CJB and one-third Marschall TM CAF which includes *Streptococcus lactis* subsp. *diacetylactis* (ATCC No. 15346), *S. cremoris* (ATCC No. 9625) or *S. lactis* (ATCC No. 14871) and Leuconostoc strains. The mixture was stirred for 3 minutes to distribute the bacterial cells, then allowed to set undisturbed with the water-jacket temperature adjusted to 90° F.; pH is 6.15. At 1 hour intervals, the product was stirred for 1 minute, the pH was measured and the progress of the fermentation evaluated:

At 1 hour, pH=6.10 Smooth, faint clean taste
At 2 hours, pH=6.00 Faint aroma
At 3 hours, pH=5.78 Some $CO_2$ gas, clean flavor
At 4 hours, pH=5.52 Clean taste, slight aroma.

At this point, with a pH of 5.52 as well as a clean flavor and clean aroma, the milk was cooled to 44° F. During cooling, the fermentation continued and the pH was lowered to 5.38. At 44° F. an acidifying, flavoring mixture consisting of 400 grams of 80% lactic acid, 123 grams citric acid, 77 grams acetic acid and 148 grams of dilute starter-distillate flavor (a product made by the steam distillation of a lactic acid bacterial fermentation which contains diacetyl) was added with vigorous stirring. The acid flavoring was stirred into the fermented milk for 3 minutes. The acidified milk was then allowed to set undisturbed for 10 minutes. The resulting product had a pH of 4.53 with a clean and pleasant taste. The aroma was slightly weak but present, and a $CO_2$ tingle could be detected on the tongue. The finished product was pumped into gallon jugs and refrigerated.

The next day a medium heavy buttermilk consistency had developed (viscosity 600 cps.) and the pH had equilibrated to 4.65. The product had a faint buttermilk aroma, a clean pleasant taste, no off-flavors of any kind and the presence of $CO_2$ was easily detected.

After 63 days of refrigerated storage, the product was still drinkable with a clean acid flavor, although a small layer of whey had formed on top. The stored product had a viscosity of 660 cps. and a pH of 4.75.

EXAMPLE IV

Production of Cultured-Acidified Buttermilk 0.09% by weight locust bean gum, 0.035% by weight gum karaya, 0.13% by weight monoammonium phosphate, 0.03% by weight carrageenan and 0.05% by weight propylene glycol alginate, as well as 10 grams of non-fat milk powder, 2 grams of salt, and 2 grams of sodium citrate are added to two quarts of low-fat (½%  butterfat) milk at 104° F. The mixture was stirred for 10 minutes to hydrate and dissolve the ingredients, heated to 190° F., and held at that temperature for 10 minutes to activate the stabilizing gums and pastaurize the blend. The mixture was then cooled to 89° F., at which point was added 100 ml. of citrated whey containing the same actively growing bacterial culture used in Example I. The resulting mixture was allowed to incubate at room temperature overnight. The resulting media was cloudy and $CO_2$ gas evolved readily when the media bottle was gently shaken, indicating an actively growing culture.

The added culture was stirred into the milk base for 2 minutes to insure distribution of the bacterial cells, with a resulting pH of 6.38. The milk was then incubated at 86° F. and its pH monitored.

At 2 hours, pH=6.19
At 3 hours, pH=5.90
At 4 hours, pH=5.59.

At 4 hours a clean, pleasant flavor and aroma were present. The milk was then cooled to 47° F. to slow down the bacterial growth and prevent any off-flavors from developing. Upon cooling, the pH measured 5.50. To further prevent bacterial growth, and the possible production of off-flavors, the cooled base was then acidifed with 12 ml. of an acidifying flavoring mixture containing 40.0% pure lactic acid, 16.0% citric acid, 25.0% acetic acid and starter distillate type flavorings to reduce the pH to 4.48. After addition of the acid mixture with vigorous stirring, the acidified product was allowed to set undisturbed for 10 minutes and stirred again. The cultured-acidified buttermilk was then packaged and refrigerated.

By the next day, the resulting product had developed a heavy buttermilk consistency with a viscosity of 1340 cps. No whey was present in the product and it poured smoothly with buttermilk characteristics. The taste was very clean, pleasant, with a slightly weak but clean aroma. A $CO_2$ tingle was detectable.

After 34 days of refrigerated storage, the product was still good, with a clean, tart and pleasant flavor. The $CO_2$ content had increased slightly but the aroma was still the same.

EXAMPLE V

Cultured-Acidified Buttermilk 7.3 grams of a stabilizing mixture containing 25.7% by weight locust bean gum, 10.2% by weight gum karaya, 38.0% by weight monoammonium phosphate, 15.5% by weight carrageenan, and 10.6% by weight propylene glycol alginate, as well as 10 grams of non-fat milk powder, 2 grams of salt and 1 gram of sodium citrate, were added to two quarts of low-fat (½% butterfat) milk at 95° F. After stirring and hydrating the ingredients for 10 minutes, the mixture was heated to 193° F. and held at this temperature for 10 minutes before cooling to 91° F. At this temprature, 100 ml. of the citrated whey media mixture of Example I was added and thoroughly mixed.

After mixing the culture into the milk (pH 6.30), it was incubated at 86° F., and observed at intervals for a drop in pH value.

At 2 hours, pH=6.20
At 3 hours, pH=5.94
At 4 hours, pH=5.60.

After 4 hours, the partially fermented milk had a very clean, faint tart taste, clean aroma, and a trace of $CO_2$ gas. To prevent deterioration of this flavor by further fermentation, the product was quickly cooled to 47° F. (pH 5.60) and acidified to a pH of 4.55 by adding 11 ml. of an acidifying flavoring mixture consisting of 40.0% pure lactic acid, 16.0% citric acid, 14.0% acetic acid and 11.0% starter distillate.

When the acid and flavoring was completely distributed, the agitation was stopped and the acidified milk allowed to set undisturbed for 10 minutes. At this point the flavor was very clean, and medium tart with a pleasant background taste effect from the $CO_2$ present. The buttermilk was stirred one more time, packaged and refrigerated.

The next day the product had thickened to a buttermilk consistency with a viscosity of 1260 cps. No whey was present and the product had all the physical characteristics of buttermilk. The taste was still excellent, clean, pleasant, tart and the product had a good $CO_2$ level and a clean, pleasant aroma.

After 33 days of refrigerated storage, the product was still good. There was a trace layer of whey on top, but the flavor was still clean, pleasant and undeteriorated.

EXAMPLE VI

Production of Cultured-Acidified Yogurt 68 grams of low-heat non-fat milk solids and 45.4 grams of a stabilizer mixture composed of 50 parts of modified food starch, 39 parts of gelatin, 6 parts of propylene glycol emulsifier and 5 parts of guar gum were added to 2 quarts of low-fat (2% butterfat) milk at 85° F. The added ingredients were allowed to hydrate in the milk with stirring for 10 minutes. The mixture was then heated to 190°-192° F. and held at that temperature for 5 minutes to pasteurize the mixture and activate the stabilizing ingredients. The product was then cooled to 100° F., whereupon 120 ml. of an actively growing culture of Dannon plain yogurt in milk was added. The milk was stirred to distribute the bacteria and the inoculated milk then incubated at 86° F. The pH at this point measured 6.05. The progress of the fermentation was judged and a pH measurement made at regular intervals.

At 1 hour the pH measured 5.90. The product exhibited some aroma and a faint taste. At 2¼ hours the pH measured 5.40. The product had a soft curd set and exhibited a typical yogurt aroma and a faint taste. At 3¼ hours the pH measured 4.87. The product exhibited a firmer set and was slightly pasty with a yogurt aroma and typical yogurt taste (acetaldehyde). At this point the product was cooled with stirring to 71° F., the usual temperature for directly acidifying products like yogurt and sour cream. The pH now measured 4.80.

The product was directly acidified by adding 27 ml. of an acidifying mixture of food grade materials having the composition:

| 80% Lactic Acid | 43 parts |
| --- | --- |
| Citric Acid | 10 parts |
| Acetic Acid | 4 parts |
| Water | 41 parts |
| Starter distillate flavor | 2 parts. |

The added acid mixture was distributed throughout the product by hand stirring with a spoon. Some thickening and curding was noticed, as expected, then the mass smoothed. The pH measured 3.90. Taste was sharp and clean with typical yogurt character.

The product was poured into containers and refrigerated. After refrigerating overnight, the yogurt had a slight soft gel set that stirring out smooth; there was no whey visible. Viscosity measured 78,000 centipoises. Taste was sharp, biting and slightly astringent; in other words, a typical yogurt flavor. After 3 weeks of refrigerated storage, the product had not changed at all. Flavor or body had not deteriorated in any way.

EXAMPLE VII

Production of Cultured-Acidified Yogurt

Fifty-seven grams of low-heat non-fat milk powder and 42 grams of stabilizer mixture composed of 17 parts modified food starch, 13 parts gelatin, 4 parts ammonium phosphate, 3.5 parts guar gum, 2 parts propylene glycol emulsifier, 1.5 parts of locust bean gum, and 1 part carrageenan were added to 2 quarts of low-fat (2% butterfat) milk at 90° F. The powders were sprinkled slowly into the well-agitated milk, then allowed to hydrate, with slow stirring, for 10 minutes at 90° F. The milk mixture was then heated to 189°-190° F. and held at this temperature for 5 minutes to pasteurize the mixture and activate the stabilizer. The resulting mixture was subsequently cooled to 97° F., whereupon was added 120 ml. of an actively growing milk culture of Dannon plain yogurt containing the normal yogurt organisms, i.e., S. thermophilus and L. bulgaricus. The milk was stirred long enough to evenly distribute the organisms, whereupon stirring was stopped and the inoculated milk incubated at 86° F. The pH was 5.90 after mixing in the acid starter.

At approximately 1 hour intervals the product was stirred, observed, tasted, and a pH measurement made. At 1½ hours the pH was 5.78. The product was thick and smooth and exhibited some aroma. At 2 hours the pH was 5.62 and the product exhibited more aroma. At 3 hours the pH was 5.26. A typical aroma and some taste were exhibited by the product. At 4 hours the pH was 4.86. A strong yogurt aroma, slight curd set, and a smooth, medium yogurt taste was exhibited by the product. At this point the product was cooled with agitation to 72° F.; the pH measured 4.82. The resulting product was directly acidified by adding 28 ml. of a liquid mixture of food grade acids having the following compositions:

| 80% Lactic Acid | 43 parts |
| --- | --- |
| Citric Acid | 10 parts |
| Acetic Acid | 4 parts |
| Water | 41 parts |
| Starter distillate | 2 parts. |

The added acids and flavoring were mixed into the milk base by hand stirring with a spoon until a homogeneous mixture was obtained. The resulting product was smooth and medium thick with a pH of 3.89. Product aroma was good and the taste was typical of yogurt, i.e., slightly astringent and puckery. The acidified product was packaged and refrigerated.

After refrigerating, the product had set to a soft gel structure with a very smooth consistency and a shiny pleasing appearance. There was no whey separation in evidence. The viscosity of the resulting product measured 53,000 centipoises, stirred easily, was very smooth, did not lose any body by stirring, and had an acceptable soft yogurt-type consistency.

After 3 weeks of refrigerated storage, the product had not changed at all nor had its flavor, body or appearance deteriorated in any way.

EXAMPLE VIII

Production of Cultured-Acidified Sour Cream

Twenty-eight grams of a stabilizing mixture of ingredients comprising 44 parts tapioca flour, 40 parts modified food starch, 8 parts guar gum, and 8 parts salt, as well as 4 grams sodium citrate, a substrate used for bacterial growth and flavor development, were added to 2 quarts of commercial light cream (18% butterfat) at 90° F.

The added ingredients were allowed to hydrate at 90° F., with stirring, for 5 minutes. The mixture was then heated slowly to 190° F. to pasteurize the blend and activate the stabilizing ingredients. After 1 minute at 190° F., the mixture was cooled to 89° F., where there was added 120 ml. of an actively growing mixed culture of acid producing and flavor producing organisms. This culture was composed of one-third Marschall TM Frozen Concentrated CAF, one-third Hansen TM Dri Vac No. 8, and one-third Hansen TM Dri Vac No. 70. When the added starter had been uniformly distributed throughout the cream, stirring was stopped and the cream was incubated at 86° F. The pH measured 6.60.

At intervals the cream was stirred, observed, tasted and a pH measurement made. At 1 hour the pH was 6.53 and the product exhibited a smooth texture but no taste or aroma. At 2 hours the pH was 6.40 and the product exhibited a faint taste and aroma. At 3¼ hours the pH was 6.12 and the product exhibited some aroma and taste. At 4 hours the pH was 5.85 and some typical sour cream taste and aroma were noted. At 5 hours the pH was 5.46 and the product exhibited a very clean, increased flavor and aroma. At 6 hours the pH was 5.15 and the product exhibited a smooth, medium firm set, as well as a clean taste and aroma. At this point, to prevent any deterioration of the flavor, the partially fermented cream was cooled with stirring to 70° F. and directly acidified by adding 10 ml. of a liquid acidifying composition containing the following food grade ingredients:

| 80% Lactic Acid | 43 parts |
|---|---|
| Citric Acid | 10 parts |
| Acetic Acid | 4 parts |
| Water | 41 parts |
| Starter distillate flavor | 2 parts. |

The acidulant was mixed into the cream by stirring gently with a large spoon. The cream thickened, curded some, then smoothed. The pH measured 4.37. After setting 10 minutes, the acidified cream had firmed slightly. It was stirred again, packaged and refrigerated.

After refrigerating, the product developed the typical sour cream "body" or consistency. Viscosity was 170,000 centipoises, the product stirred very smooth, was shiny and no whey was visible. The aroma was typical sour cream, while the taste was very clean, mildly acid, pleasant and acceptable as a sour cream.

After 3 weeks of refrigerated storage, the product appearance was the same, no whey was present and no deterioration of the flavor or aroma had occurred.

EXAMPLE IX

Production of Cultured-Acidified Sour Cream 70.1 grams of a stabilizer composition consisting of 28 parts tapioca flour, 28 parts gelatin, 9 parts propylene glycol emulsifier, 3.6 parts guar gum and 1.5 parts mono-diglycerides were added to 4 quarts of commercial light cream (18% butterfat) at 100° F.

The ingredients were added slowly to the well-agitated cream, then allowed to hydrate for 10 minutes with slower stirring while the temperature was slowly raised to 110° F. Heating and stirring were then increased until a temperature of 186° F. was reached. The hot product was held at this temperature for 3 minutes to pasteurize the mixture and to heat-activate the stabilizing ingredients. The product was then cooled to 89° F., at which point there was added 240 ml. of an actively growing milk culture of acid and flavor producing bacteria comprising one-third Marschall TM Frozen Concentrated CAF, one-third Hansen TM powdered Dri-Vac culture No. 253, and one-third Hansen TM powdered Dri-Vac culture No. 91. The resulting mixture contains Streptococcus lactis, S. cremoris, and Leuconostoc strains. The cream was stirred to distribute the bacteria, stirring was then stopped, and the quiescent cream was incubated at 86° F. The pH was 6.47. At intervals the cream was stirred, observed, tasted and a pH measurement was taken. At 1 hour at a pH of 6.44 no aroma or taste was noted. At 2 hours the pH was 6.37 and trace aroma and taste were observed. At 3½ hours the pH was 6.07 and the product exhibited clean taste and a faint aroma. At 5 hours the pH was 5.72 and the consistency of the product was thicker and smoother. At 6¼ hours the pH was 5.34 and the product possessed a clean sour cream taste and aroma. The product was then cooled with stirring to 72° F., at which point the pH measured 5.25. Direct acidifying action is accomplished by stirring in with a spoon 25 ml. of a liquid acidifying mixture composed of:

| 80% Lactic Acid | 43 parts |
|---|---|
| Citric Acid | 10 parts |
| Acetic Acid | 4 parts |
| Water | 41 parts |
| Starter distillate flavor | 2 parts. |

Upon acidification, the cream curded, thickened, then smoothed. The resulting product had a clean and pleasant taste. The entire quantity was then packaged in one large container and refrigerated.

After refrigerating, the product set to a slight gel without whey separation. The sour cream stirred slightly gelatinously but smoothed eventually to a very acceptable sour cream consistency. Viscosity was 215,000 centipoises.

After 20 days of refrigerated storage, the product appearance had not changed at all, there was no whey separation, and the flavor and aroma had not deteriorated to any detectable degree.

It is claimed:

1. A method for the production of a cultured dairy product from a liquid dairy medium comprising adding a starter culture at a concentration of about 4–6% by weight of the liquid dairy medium and fermenting said medium at a temperature of about 80°–90° F. to reduce the pH of the medium to a range of from about 5.2 to about 6.2 and to develop desirable flavors and aromas, and, prior to the development of off-tastes, cooling the medium to a fermentation rate-reducing temperature, and acidulating the medium with a food grade acid to a pH of 4.7 or below to produce a cultured dairy product.

2. The method of claim 1 wherein the food grade acids are selected from the group consisting of lactice acid, citric acid and acetic acid.

3. The method of claim 1 wherein said temperature is about 86° F.

4. The method of claim 1, 2, or 3 wherein the cultured dairy product produced is buttermilk.

5. The method of claim 4 wherein the fermentation culture is predominantly comprised of *Streptococcus lactis*, subsp. *diacetylactis*, *Streptococcus cremoris*, *S. Lactis*, and an aroma- and flavor-producing strain of and *Leuconostoc cremoris*.

6. The method of claim 4 wherein the fermentation culture comprises *streptococcus lactis*, subsp. *diacetylactis*, ATCC No. 15346; *S. cremoris*, ATCC No. 9625; *S. Lactis*, ATCC No. 14871; and *Leuconostoc cremoris*, ATCC No. 19254.

7. The method of claim 4 wherein the fermentation culture comprises *Streptococcus lactis*, subsp. diacetylactis.

8. The method of claim 4 wherein the diary medium contains at least one stabilizer selected from the group consisting of locust bean gum, guar gum, gum karaya, monoammonium phosphate, carrageenan, propylene alginate and salt.

9. The method of claim 4 wherein the fermentation culture comprises by weight about 20% to about 50% of *Streptococcus lactis*, subsp. *diacetylactis*, about 40% to about 60% of *S. cremoris*, about 10% to about 20% of *S. lactis*, and about 8% to about 12% of an aroma- and flavor-producing strain of *Leuconostoc cremoris*.

10. The method of claim 4 wherein the fermentation culture comprises by weight about 30% of *S. lactis*, subsp. *diacetylactis*, about 50% of S. cremoris, about 10% of *S. lactis* and about 10% of an aroma- and flavor-producing strain of *Leuconostoc cremoris*.

11. The method of claim 4 wherein about 0.10% to 0.30% by weight of sodium citrate is added to the liquid dairy medium prior to fermenting.

12. The method of claim 4 wherein the liquid dairy medium contains at least one ingredient selected from the group consisting of fresh whole milk, skim milk, cream, and non-fat milk powder.

13. The method of claim 4 wherein the pH of the medium is reduced by fermentation to a pH in the range of about 5.2 and 6.2 prior to acidulation.

14. The method of claim 4 wherein the fermented medium is cooled to a fermentation rate-reducing temperature in the range of about 40° F. to 50° F. prior to acidulation.

15. The method of claims 1, 2 or 3 wherein the cultured dairy product produced is yogurt.

16. The method of claim 15 wherein the fermentation culture comprises Lactobacillus bulgaricus and Streptococcus thermophilus.

17. The method of claim 15 wherein the liquid dairy medium comprises low fat milk and non-fat milk powder.

18. The method of claim 15 wherein the liquid dariy medium contains at least one stabilizer selected from the group consisting of modified food starch, gelatin, ammonium phosphate, locust bean gum, guar gum, propylene glycol emulsifier and carrageenan.

19. The method of claim 15 wherein the medium is reduced by fermentation to a pH of between about 4.5 and 5.2 prior to acidulation.

20. The method of claim 15 wherein the fermented medium is cooled to a fermentation rate-reducing temperature ranging between about 65° to 75° F. prior to acidulation.

21. The method of claims 1, 2 or 3 wherein the cultured dairy product produced is sour cream.

22. The method of claim 21 wherein the fermentation culture comprises *Streptococcus lactis*, *S. cremoris*, and an aroma- and flavor-producing strain of *Leuconostoc cremoris*.

23. The method of claim 21 wherein the fermentation culture comprises *Streptococcus lactis*, ATCC No. 14871, *S. cremoris*, ATCC No. 9625 and *L. cremoris*, ATCC No. 19254.

24. The method of claim 21 wherein sodium citrate is added to the liquid dairy medium prior to fermenting.

25. The method of claim 21 wherein the liquid dairy medium contains ingredients selected from the group consisting of light cream having a butterfat content of about 18 to 20%.

26. The method of claim 21 wherein said liquid dairy medium contains ingredients selected from the group consisting of light cream having a butterfat content of about 18 to 20%, tapioca flour, modified foof starch, guar gum and salt.

27. The method of claim 21 wherein the pH of the medium is reduced by fermentation to between about 5.1 and 5.4 prior to acidulation.

28. The method of claim 21 wherein the fermented medium is cooled to a fermentation rate-reducing temperature in the range of about 70° to 72° F. prior to acidulation.

* * * * *

UNITED STATES PATENT AND TRADEMARK OFFICE
CERTIFICATE OF CORRECTION

PATENT NO. : 4,416,905
DATED : November 22, 1983
INVENTOR(S) : Lundstedt et al.

It is certified that error appears in the above-identified patent and that said Letters Patent is hereby corrected as shown below:

Column 2, line 7, "diary" should be "dairy".

Column 2, line 12, "diary" should be "dairy".

Column 2, line 60, "diary" should be "dairy".

Column 2, line 63, "diary" should be "dairy".

Column 2, line 68, "diary" should be "dairy".

Column 4, line 19, "ATCC No. 19154" should be "ATCC No. 19254".

Claim 8, column 13, line 47, "diary" should be "dairy".

Claim 18, column 14, line 23, "dariy" should be "dairy".

Claim 26, column 14, line 54, "foof" should be "food".

Signed and Sealed this

Seventh Day of February 1984

[SEAL]

Attest:

GERALD J. MOSSINGHOFF

*Attesting Officer*  *Commissioner of Patents and Trademarks*